Patented Feb. 19, 1952

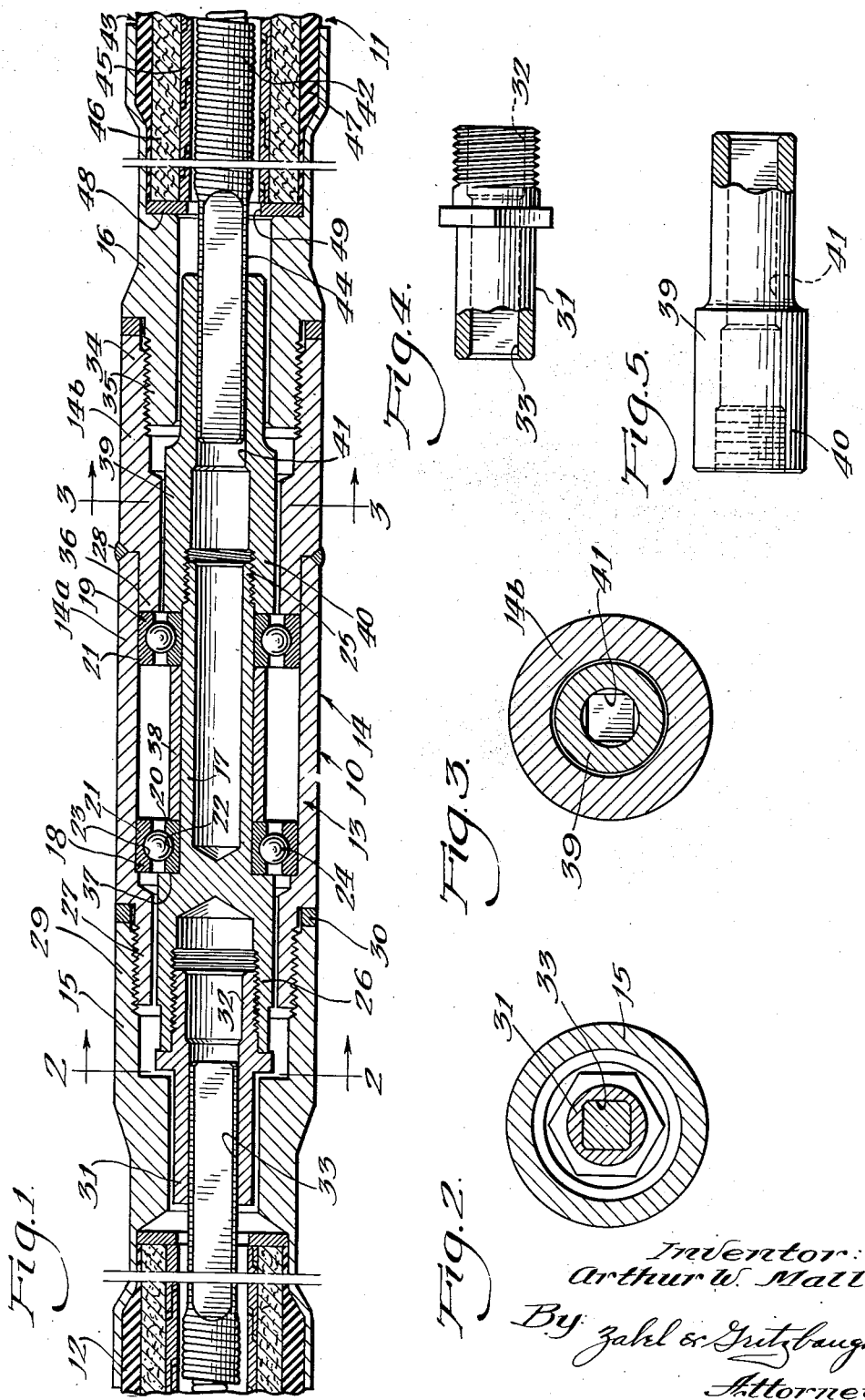

2,586,359

UNITED STATES PATENT OFFICE 2,586,359

FLEXIBLE SHAFT COUPLING

Arthur W. Mall, Flossmoor, Ill., assignor to Mall Tool Company, Chicago, Ill., a corporation of Illinois Application May 12, 1947, Serial No. 747,417

1 Claim. (Cl. 64—4)

The present invention relates to flexible shafts and more particularly to a coupling device for joining together two lengths of flexible shafts.

The principal object of the present invention is to provide a simple and yet effective coupling device wherein ball bearings are employed to reduce friction to a minimum.

The operation of joining together two lengths of shafts is made very simple with the present invention. While in the past it was necessary to thread the shaft core into the core of the coupling, the present invention eliminates this awkward operation and instead involves simply the operation of inserting the end of the shaft core into a complementary socket in the coupling core. The drive of the shaft core through the coupling is positive and effective and when one desires to separate the shaft core from the coupling core, a mere pull on the shaft withdraws the shaft core from the coupling socket. The shaft casing is threaded to the coupling shell so that before this separation is effected the shaft casing must be separated from the shell. This latter operation is simple however because both the casing and the coupling shell are very readily accessible.

The foregoing constitute some of the principal objects and advantages of the present invention, others of which will become apparent from the following description and the drawings, in which Fig. 1 is a longitudinal sectional view taken through a coupling embodying the present invention and showing the relationship between the coupling and a pair of flexible shaft lengths, the latter being shown only fragmentarily;

Fig. 2 is a transverse sectional view taken through the coupling, the view being taken on the line 2—2 of Fig. 1;

Fig. 3 is another transverse sectional view taken through the coupling, the view being taken on the line 3—3 of Fig. 1;

Fig. 4 is a plan view of one socket member employed in connecting the flexible shaft core to the ball bearing coupling, the view being shown partially in section; and Fig. 5 is a view corresponding to Fig. 4 but illustrating another socket member shown in Fig. 1 at the opposite end of the ball bearing coupling member.

For purposes of illustration two embodiments of the present invention are illustrated, it being recognized, of course, that many modifications may be made without departing from the intended scope of the invention.

Referring to the drawings the present invention is illustrated in connection with a coupling generally indicated at 10 that joins together a pair of flexible shaft lengths indicated at 11 and 12. The coupling 10 comprises a shell generally indicated at 13 that as shown is made up of a central shell portion 14 with a pair of shell end portions 15 and 16 disposed at opposite ends of the central portion.

The central shell portion 14 houses a coupling core 17 that is adapted to rotate in the central shell portion 14, on ball bearing members generally indicated at 18 and 19. This central shell portion 14 is divided into two central shell segments 14a and 14b. These ball bearing members 18 and 19 are identical and each comprises an inner ring 20 that is mounted concentrically about the coupling core 17 and an outer ring 21 that engages the inner wall of the central shell segment 14a. The inner and outer rings 20 and 21 are spaced apart and are provided with complementary ball bearing races 22 and 23 respectively between which races a plurality of ball bearings 24 are held.

The coupling core 17 is provided at one end with a threaded male coupling portion 25 and at the opposite end with a female threaded coupling portion 26. The central shell segment 14a is provided at one end with a threaded male portion 27 and at the opposite end thereof the central shell segment 14a is welded as at 28 to the central shell segment 14b.

The end shell portion 15 is provided with a threaded female coupling portion 29 that is adapted to thread onto the male portion 27 of the central shell 14a and a gasket 30 may be provided between the end shell portion 15 and the central shell portion 14. The opposite end of the end shell portion 15 is fixed in some suitable manner to the end of the flexible shaft length 12. The end shell member 15 is hollow so as to house therein a socket member 31 that is provided with a threaded male coupling portion 32 at one end thereof. Thus the socket member 31 is adapted to thread into the female socket portion 26 of the coupling core 17. As best shown in Fig. 2 the socket member 31 is provided with a rectangular socket 33 therein.

The central shell segment 14b is provided with a threaded female coupling portion 34 that is adapted to receive a threaded male coupling portion 35 that is disposed at one end of the end shell portion 16. The opposite end of the end shell portion 16 is suitably attached to the end of the flexible shaft length 11.

The central shell segment 14b is provided with an annular shoulder portion 36 against which the ball bearing member 19 rests. The coupling core 17 is provided with a shoulder 37 against which the ball bearing member 18 rests. A spacer sleeve 38 is mounted concentrically about the coupling core 17 between the ball bearing members 18 and 19 so as to maintain the proper spacing between these two ball bearing members.

Rotatably mounted in the central shell segment 14b is a socket member 39 that is provided with a threaded female coupling portion 40 that is adapted to thread onto the male coupling portion 25 of the coupling core 17. The socket member 39 is provided at its opposite end as best shown in Fig. 3 with a square or rectangular socket 41. Each of the flexible shaft lengths 11 and 12 comprises a central rotatable flexible shaft core 42 that is rotatably housed in a housing 43. The shaft core 42 is provided at one end thereof with a coupling portion 44 that is square or rectangular in cross section so as to be received in the socket 33 or 41 of the appropriate socket member 31 or 39.

The housing 43 comprises a flexible liner 45 that is surrounded by a sheath 46. This sheath 46 in turn is encased in a hose or the like 47. An end cap or closure member 48 is fixed to the end of the casing 43 and is apertured at 49. The shaft coupling 44 projects through this aperture 49 in the end wall 48.

Thus there is provided a flexible shaft coupling arrangement that is effective and relatively simple. The operation of attaching a shaft length to the coupling involves merely the steps of first providing a socket member 31 or 39 on the core 17 of the coupling 10 and then merely inserting the coupling portion 44 of the shaft core 42 into the socket 33 or 41 as the case may be and then finally threading the end member 15 or 16 in place on the central coupling portion 14 of the coupling 10. The assembly is thereby made complete and rotation of one shaft core 42 is conveyed to the other shaft core through the coupling members 31 and 39 and the coupling core 17.

I claim:

A coupling for connecting two flexible shafts comprising an elongated tubular core having a shoulder formed thereon, bearing assemblies disposed on said core in spaced axial relation, a spacer between said bearing assemblies, one of said assemblies being disposed in abutting relation against said shoulder, a first socket member removably secured to one end of said core and having a shoulder abutting the other of said bearing assemblies and locking said bearing assemblies in place against said spacer, said core having a socket in the opposite end thereof, and a housing disposed around said bearing assemblies.

ARTHUR W. MALL.

REFERENCES CITED

The following references are of record in the file of this patent:

UNITED STATES PATENTS

| Number | Name | Date |
|---|---|---|
| 1,320,582 | Sperling | Nov. 4, 1919 |
| 1,433,537 | Elliott | Oct. 31, 1922 |
| 1,871,528 | Joline | Aug. 16, 1932 |
| 1,926,999 | Keller | Sept. 12, 1933 |
| 2,222,613 | Green | Nov. 26, 1940 |

FOREIGN PATENTS

| Number | Country | Date |
|---|---|---|
| 752,264 | France | 1933 |